United States Patent [19]
Barton et al.

[11] Patent Number: 4,694,928
[45] Date of Patent: Sep. 22, 1987

[54] OPERATOR RESTRAINT SYSTEM

[75] Inventors: James C. Barton, Peoria; Robert E. Hefner, Morton, both of Ill.; Paul A. Reid, Mentor; Frank R. Sable, Wickliffe, both of Ohio

[73] Assignee: Caterpillar Industrial Inc., Mentor, Ohio

[21] Appl. No.: 872,346

[22] Filed: Jun. 9, 1986

[51] Int. Cl.$^4$ .............................................. B60R 21/10
[52] U.S. Cl. ..................... 180/268; 280/801
[58] Field of Search ........................ 180/268, 274, 282; 280/801, 808; 297/483

[56] References Cited

U.S. PATENT DOCUMENTS

| | | | |
|---|---|---|---|
| 3,177,966 | 4/1965 | Schoeffler et al. | 180/268 |
| 3,248,148 | 4/1966 | Board | 297/388 |
| 3,901,459 | 8/1975 | Romanzi et al. | 242/107.4 |
| 3,901,460 | 8/1975 | Dully et al. | 242/107.4 |
| 4,189,022 | 2/1980 | Lazich et al. | 180/268 |
| 4,191,421 | 3/1980 | Lechter | 297/483 |
| 4,366,604 | 1/1983 | Anthony et al. | 24/230 |
| 4,391,344 | 7/1983 | Weber et al. | 180/271 |
| 4,541,504 | 9/1985 | Lassche | 180/268 |
| 4,553,625 | 11/1985 | Tsuge et al. | 180/268 |
| 4,574,911 | 3/1986 | North | 180/282 |

FOREIGN PATENT DOCUMENTS

| | | | |
|---|---|---|---|
| 2463028 | 3/1981 | France | 180/268 |
| 1020246 | 2/1966 | United Kingdom . | |

*Primary Examiner*—John J. Love
*Assistant Examiner*—Ross Weaver
*Attorney, Agent, or Firm*—Alan J. 40Hickman

[57] ABSTRACT

Operator restraint systems of the type having a lap belt restrain the operator at all times including side tipovers. An operator restraint system has an apparatus for connecting a lap belt first end portion to an operator's station at a location adjacent a seat first side and an apparatus for connecting a lap belt second end portion to the operator's station at a location adjacent a seat second side and an apparatus for releasing one of the first and second lap belt end portions from connection with the operator's station in response to an impact being applied in a direction transverse to one of the first and second seat side portions. Therefore, the lap belt is released during side tipover impacts and the problems associated therewith are overcome. The operator restraint system is particularly suited for use on a material handling vehicle.

25 Claims, 9 Drawing Figures

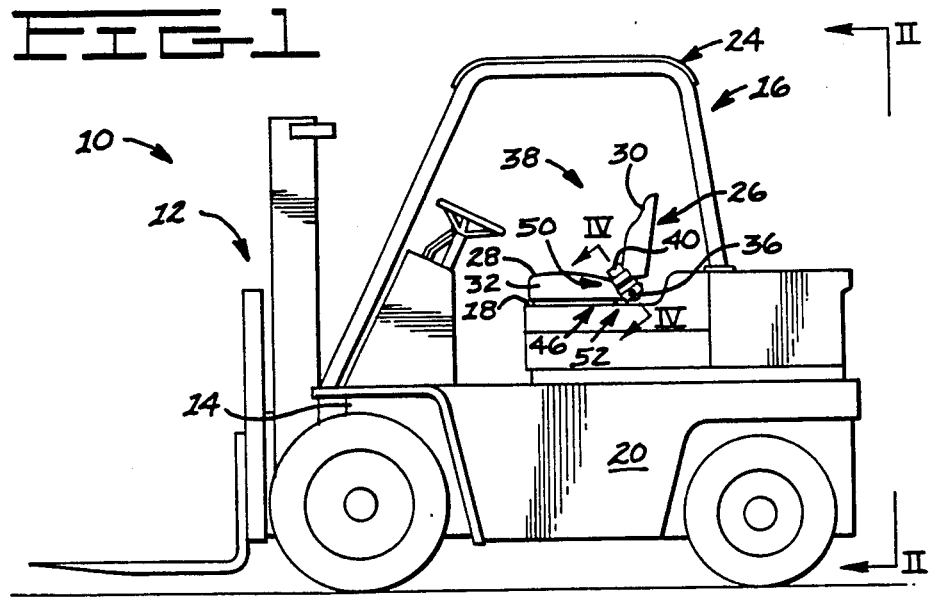
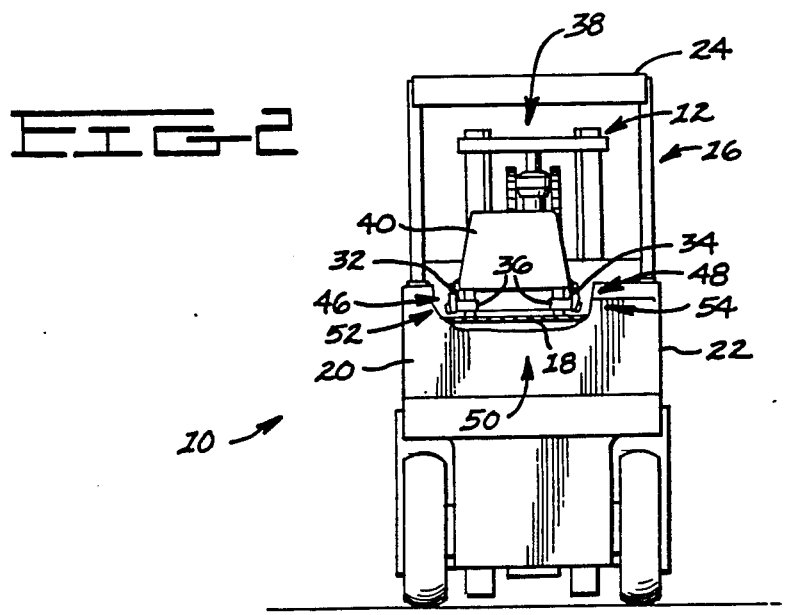

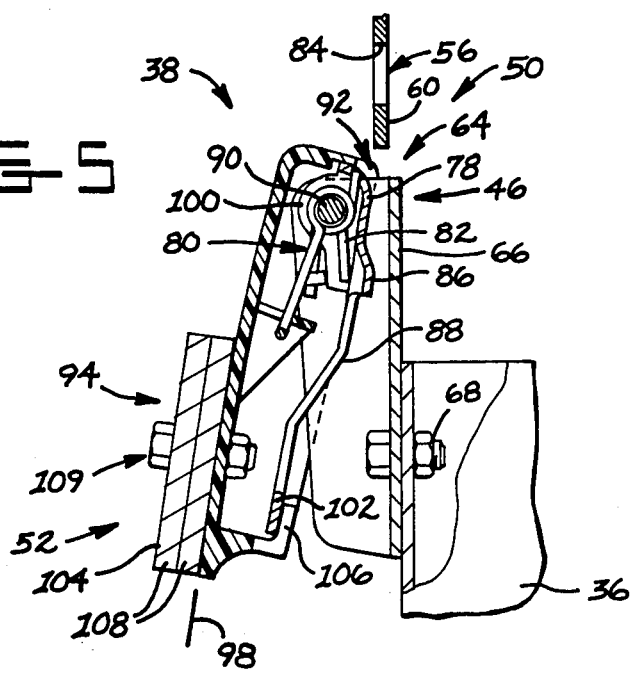
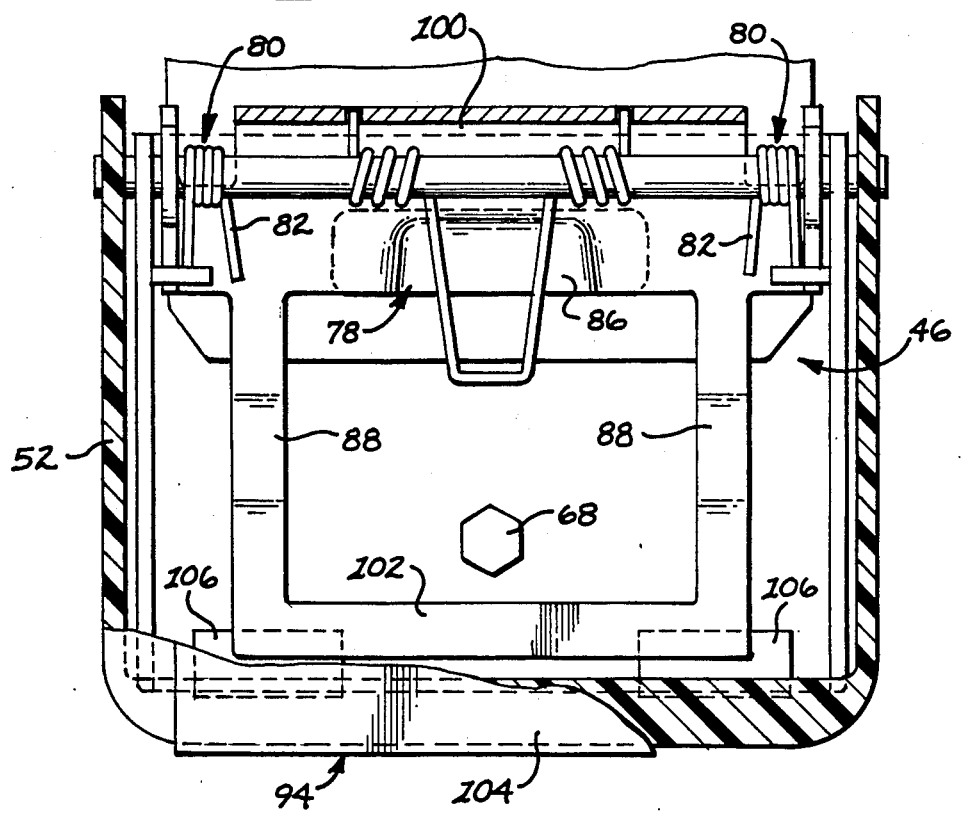

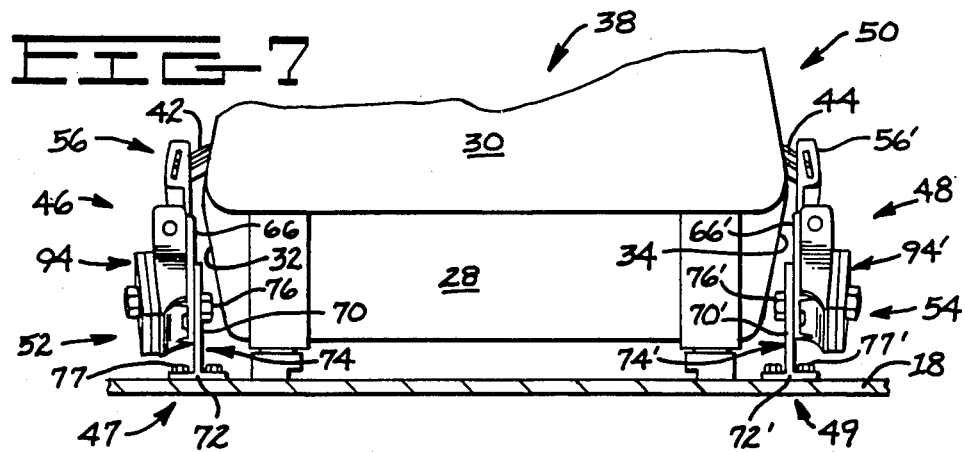
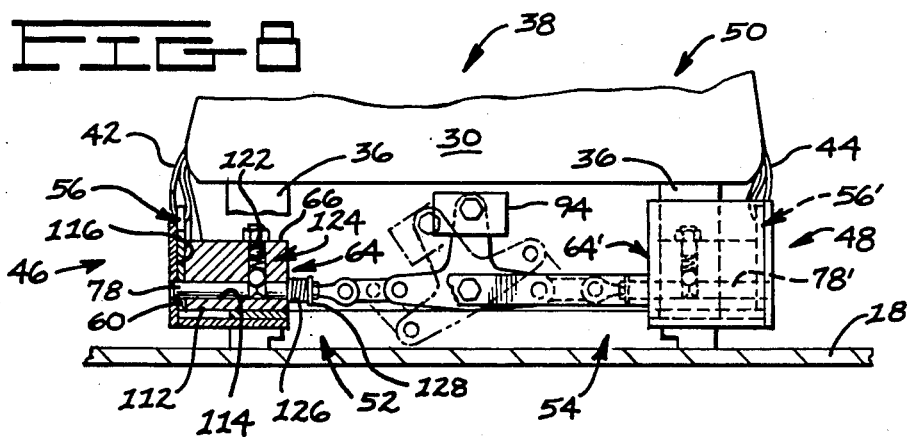
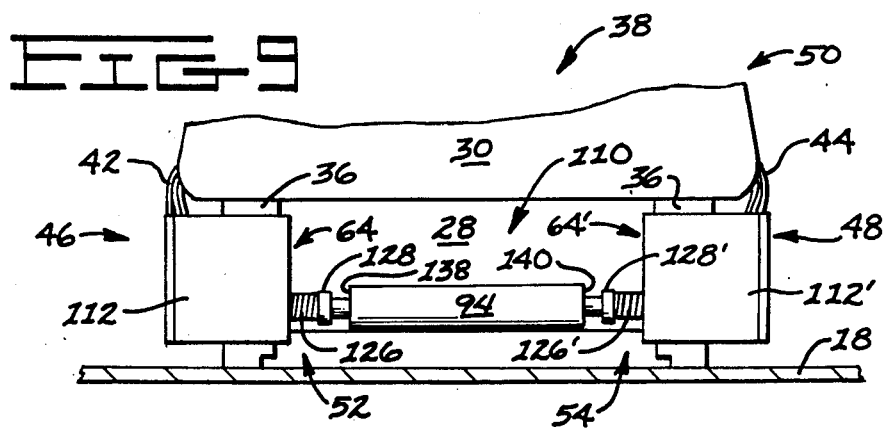

OPERATOR RESTRAINT SYSTEM

DESCRIPTION

1. Technical Field

This invention relates to an operator restraint system for a work vehicle and, more particularly, to an operator restraint system for a material handling vehicle having a lap belt which is releasable in response to side tipover.

2. Background Art

Operator restraint systems which utilize seat or lap belts are well-known in the art. Typically, the lap belt is permanently connected at a first end portion of the opertor's station or operator's seat and releasably connected at a second end portion to a second location on the operator's station or seat. The seat belt traverses the operator's lap and secures the operator from movement in directions forward (longitudinal) relative to the direction of travel of the vehicle. The seat belt also restrains the operator from leaving the seat in response to impacts in directions sideways (transverse) to the direction of vehicle travel. A typical system of this type is shown in U.S. Pat. No. 3,248,148 to R. G. Board et al. dated Apr. 26, 1966.

In applications, such as automobiles, wherein the average speed of the vehicle is at a relatively high rate and wherein impact in substantially the direction of travel of the vehicle is the main concern, a lap belt such as that disclosed in the above-noted U.S. patent is desirable. Conversely, in applications, such as material handling vehicles wherein the speed of the vehicle is relatively slow, the importance of a lap belt for impacts in directions longitudinal of vehicle travel is substantially less and the need for a lap belt is reduced.

Material handling vehicles, i.e., lift trucks, usually have a narrow-width, a lift mast, and an overhead guard. Although lift trucks are designed to resist side tipovers, improper operator use and abuse of the lift truck does occur which may cause, in rare occurrences, a side tipover. A lap belt would restrain the vehicle operator and prevent him from exiting the lift truck during a side tipover and therefor, reduce the potential of contact between the operator and vehicle overhead guard. However, seat belts have generally not been supplied on lift trucks because, when the lift truck impacts the ground during a lateral tipover, the restraint of the seat belt forces the operator's upper torso to pivot about his hips which forces his upper torso and head toward the ground. Calculations and tests with anthropomorphic test devices have shown that, in representative tipovers with a lap belt, the operator's head can impact the ground at relatively high velocities. Additional tests have shown that a free operator has the ability to orient himself so that instead of striking the ground with his upper body and head, he makes contact on his buttocks or hips, with consequently less likelihood or serious injury.

The present invention is directed to overcoming one or more of the problems as set forth above and provide an operator restraining system which restrains the operator from movement in the forward direction relative to longitudinal vehicle movement and restrains the operator in side overturn conditions until impact is encountered between a side of the vehicle and the ground, at which time the operator is released to slide from the seat.

DISCLOSURE OF THE INVENTION

In one aspect of the present invention, an operator restraint system for a work vehicle having an operator station, and a seat having first and second spaced apart side portions is mounted on the operator's station. A connecting apparatus is provided for connecting a first end portion of a lap belt to the operator station at a location adjacent the seat first side and another connecting apparatus is provided for connecting a second end portion of the lap belt to the operator station at a location adjacent the seat second side. A releasing apparatus automatically releases one of the first and second lap belt end portions from connection with the operator's station in response to an impact being applied to said vehicle in a direction transverse to one of the first and second seats side portions is provided.

In another aspect of the present invention, a material handling vehicle having an operator's station, and a lap belt having first and second spaced apart end portions is provided. The operator's station has a seat, a seat supporting surface, first and second spaced apart substantially parallel vehicle side portions connected to the seat supporting surface and an overhead guard. The seat has first and second spaced apart side portions and is mounted on the seat supporting surface at a location between the first and second vehicle sides and beneath the overhead guard. A connecting apparatus is provided for connecting the lap belt first end portion to the operator's station at a location adjacent the seat first side, and another connecting apparatus is provided for connecting the lap belt second end portion to the operator's station at a location adjacent the seat second side. A releasing apparatus is provided for automatically releasing the lap belt first end portion from connection with the operator's station in response to an impact being applied to one of the first and second vehicle sides, and another releasing apparatus is provided for automatically releasing the lap belt second end portion from connection with the operator's station in response to an impact being applied to the other of the first and second vehicle sides.

The operator restraint system of the subject invention provides operator restraint during normal vehicle operation and provides restraint of the vehicle operator during tipover until impact between the vehicle and ground occurs, at which time the seat belt is automatically released from connection with the operator's station.

BRIEF DESCRIPTION OF THE DRAWINGS

FIG. 1 is a side elevational view of a material handling vehicle showing the first end portion of a lap belt of an operator's restraint system connected to the vehicle seat support frame;

FIG. 2 is a rear elevational view of the material handling vehicle of FIG. 1, taken along lines II—II of FIG. 1, having portions of the material handling vehicle broken away to show the operator restraint system in greater detail, to show the first and second end portion of the lap belt connected to the seat at locations adjacent the first and second seat sides, respectively, and to show the seat mounted on the seat supporting surface of the operator's station at a location closer to the first side of the operator's station than the second side;

FIG. 5 is a diagrammatic view similar to that of FIG. 4 showing the latching mechanism at a tongue releasing position at which the tongue is free from engagement with the tongue engaging member, the first end portion of the lap belt is free from connection with the operator's station, and the mass assembly is at a second position;

FIG. 6 is a diagrammatic side elevational view taken along lines IV—IV of FIG. 4 showing the latching mechanism in greater detail with portions of the mass assembly broken away for better visibility;

FIG. 7 is a rear elevational view of the operator's station showing the operator restraint system of FIG. 2 mounted on the seat support surface of the operator's station at locations adjacent the seat first and second sides;

FIG. 8 is a diagrammatic rear elevational view of the operator's station showing an alternate embodiment of the operator restraint system in which the mass assembly is mounted on a linkage assembly and pivotally movable for simultaneously releasing the tongue engaging members of each latching mechanism from engagement with the tongues; and FIG. 9 is a diagrammatic rear elevational view of the operator's station showing an alternate embodiment of the occupant restraint system of FIG. 8 in which a mass assembly is connected at opposite ends by a linkage assembly to the tongue engaging members.

BEST MODE FOR CARRYING OUT THE INVENTION

Figure 3:
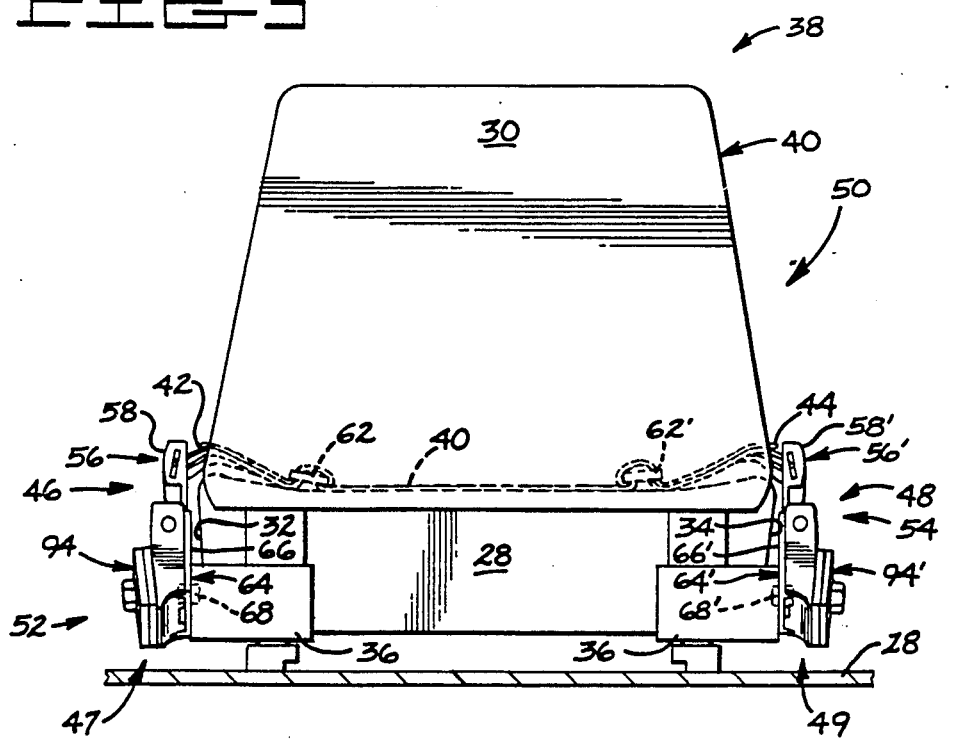
FIG. 3 is an enlarged diagrammatic rear elevational view of the operator's station of FIG. 2 showing the operator restraint system in greater detail.

With reference to FIGS. 1-3, a material handling vehicle 10, for example, a lift truck, has a lift mast assembly 12 mounted on a front end portion 14 of the vehicle 10. The lift mast assembly 12 is elevationally movable between spaced apart elevational locations for lifting a load (not shown) in a conventional manner well-known in the art. The material handling vehicle 10 has an operator's station 16 which has a seat supporting surface 18, first and second spaced apart substantially parallel sides 20,22, and an overhead guard 24. The first and second spaced apart substantially parallel sides 20,22 are connected to the seat supporting surface 18 and define opposite sides of the vehicle which are longitudinally oriented relative to the usual direction of travel of the vehicle 10. The overhead guard 24 is mounted on the vehicle 10 in any suitable well-known conventional manner.

The operator's station 16 has a seat 26 mounted on the supporting surface 18 at a location between the first and second vehicle sides 20,22 and beneath the overhead guard 24. The seat has a somewhat horizontally oriented cushion 28 and an elevationally oriented back 30 which is connected to the cushion in any conventional manner. The seat cushion 28 has first and second spaced apart side portions 32,34 which extend in a substantially longitudinal direction relative to the direction of travel of the vehicle and substantially parallel to the first and second vehicle sides 20,22. The first side of the seat cushion 32 is closer to the first side 20 of the vehicle than the second side 34 of the cushion 28 is to the second vehicle side 22. A seat frame 36 is provided for connecting the seat 26 to the support surface 18 of the operator's station 16. A plurality of fasteners of known construction (not shown) secure the seat frame 36 to the support surface 18 in any suitable well-known manner.

An operator restraint system 38 is provided for restraining the operator on the vehicle 10 during impacts in the forward (longitudinal) direction of vehicle motion and automatically releases the operator from restraint on the vehicle during side tipovers. As best seen in FIG. 3, the operator restraint system 38 includes a lap belt 40 which has first and second spaced apart end portions 42,44 separated by an elongated flexible middle portion. The lap belt is preferably made of a high strength woven cloth material of a type well-known in the industry. The operator restraint system 38 includes means 46 for connecting the lap belt first end portion 42 to the operator's station 16 at a first location 47 adjacent the seat first side 32 and means 48 for connecting the lap belt second end portion 44 to the operator's station 16 at a second location 49 adjacent the seat second side 34. The first and second locations 47,49 are spaced from one another and on either the seat supporting surface 18 (FIG. 7) or the seat frame 36 (FIG. 3).

The operator restraint system 38 also includes means 50 for releasing one of the first and second lap belt end portions 42,44 from connection with the operator's station 16 in response to an impact being applied to the vehicle 10 in a direction transverse to at least one of the first and second seat side portions 32,34. Preferably, the means 50 includes means 52 for automatically releasing the lap belt first end portion 42 from connection with the operator's station 16 in response to an impact being applied to one of the first and second vehicle sides 20,22, and means 54 for automatically releasing the lap belt second end portion 44 from connection with the operator's station 16 in response to an impact being applied to the other of the first and second vehicle sides 20,22.

Because means 46,48 and means 52,54 of the preferred embodiment of FIGS. 1-7 are identical in construction, where possible, only one will be discussed in detail. Those items hereinafter discussed which represent the connection of the lap belt second end portion 44 will, where appropriate, be indentified by the same element numbers used to identify those parts which relate to the connection of the lap belt first end portion 42, but with a prime after the numeral.

Figure 4:
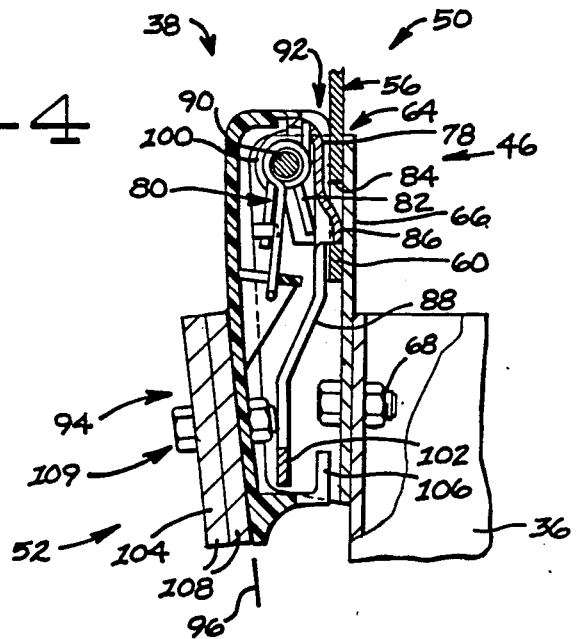
FIG. 4 is a cross sectional view taken along lines IV—IV of FIG. 1 showing a latching mechanism at a tongue engaging position at which the first end portion of the lap belt is connected to the operator station, and a mass assembly is at a first position.

Referring to FIGS. 3-7, means 46,48 each include a tongue 56,56' having first and second spaced apart end portions 58,60. The lap belt first end portion 42 is connected to the first end portion 58 of tongue 56, and the lap belt second end portion 44 is connected to the first end portion 58' of tongue 56'. Each tongue first end portion 58,58' has a pin disposed in a slot which secures the respective belt end portions 42,44 thereto in a conventional and well-known manner. An anti-creep slide 62,62' is associated with each of the first and second belt end portions 42,44 and prevents inadvertent loosening thereof in a well-known manner. Connecting means 46,48 each have a latching mechanism 64,64' and each latching mechanism has a supporting member 66,66'. As shown in FIGS. 3 and 4, the supporting members 66,66' are connected to the seat support frame 36 via fasteners 68,68', or as shown in FIG. 7, to an arm portion 70,70' which extends from the base portion 72,72' of a support bracket 74,74' by a fastener 76,76'. The base portion 72,72' is connected to the seat supporting surface 18 at said first and second spaced apart locations 47,49 by fasteners 77,77', respectively. Preferably, the fasteners 68,68' and 76,76' pivotally connect the latching mechanisms 64,64' to the supporting members 66,66'.

As best seen in FIGS. 4 and 5, the latching mechanisms 64,64' each have a tongue engaging member 78 which is movable between the tongue engaging position (FIG. 4) at which the tongue second end portion 60 is engaged with the tongue engaging member 78 and restrained from movement relative to the latching mechanism 64, and a tongue releasing position (FIG. 5) at which the tongue second end portion 60 is free from engagement with the tongue engaging member 78 and free to move relative to the latching mechanism 64.

Means 80 is provided for biasing the tongue engaging member 78 toward the tongue engaging position and retaining the tongue 56 from movement relative to the latching mechanism 64. The biasing means 80 preferably includes a pair of torsion springs 82 which are disposed between the tongue engaging member 78 and the supporting member 66. The tongue second end portion 60 has an aperture 84 disposed therethrough, and the tongue engaging portion 78 includes a protrusion 86 which is mounted on a lever arm 88 which is pivotally connected to a shaft 90 mounted on the supporting member 66. The protrusion 86 is disposed in the tongue aperture 84 at the tongue engaging position of the tongue engaging member 78 and biased in contact with the supporting member 66 at the tongue engaging position.

The supporting member 66 and the lever arm 88 are spaced a preselected distance from each other and define a guideway 92 therebetween for receiving the tongue second end portion therein. The tonque 56 is disposed in the guideway 92 at the tongue engaging position.

Releasing means 50 includes at least one of identical releasing means 52 and 54. It is to be noted, however, that both releasing means 52 and 54 may be utilized to provide automatic lap belt release irrespective of the direction of vehicle side tipover. Means 52 and 54 each includes a mass assembly 94,94'. Since the means 52 and 54 are identically constructed, only means 52 will be discussed in detail. The mass assembly 94 is connected to the tongue engaging member 78 and pivotally movable between first and second spaced apart positions 96,98 relative to the supporting member 66 in a direction substantially transverse of one of the seat first and second side portions 32,34 in response to an impact being applied to the vehicle 10 in the transverse direction. As previously mentioned, FIG. 4 shows the mass assembly 94 in a first position 96 and FIG. 5 shows the mass assembly in a second position 98. The tongue engaging member 78 is movable from the tongue engaging position 96 to the tongue releasing position, as shown in FIG. 5, in response to movement of the mass assembly 94 from the first position 96 to the second position 98. Lever arm 88 has first and second spaced apart end portions 100,102 and is pivotally connected at the lever first end portion 100 to shaft 90 and pivotable about said shaft 90 in a direction transverse to the direction of travel of the vehicle 10 (the vehicle first and second sides 20,22). Preferably, the shaft 90 is oriented in a direction substantially parallel to one of the first and second seat sides 32,34 or one of the first and second vehicle sides 20,22.

The mass assembly 94 has a weight member 104 connected to the lever arm 88 at a location adjacent the second end portion 102. As shown in FIG. 4, the mass assembly 94 has an engaging finger 106 which engages the lever second end portion 102 in response to pivotal movement of the mass assembly 94 from the first position 96 towards the second position 98 and urges the lever arm 88 about the shaft 90 and releases the protrusion 86 from being disposed in the aperture 84 of the tongue 56. The weight member 104 may include a plurality of stacked weight segments 108, and a means 109 for connecting the stacked weight segments to the lever arm 88.

With reference to the alternate embodiments, as shown in FIGS. 8 and 9, the operator restraint system 38 employs means 52,54 for releasing the lap belt first and second end portions 42,44 in response to impact forces of a preselected minimum magnitude being applied to the vehicle in directions transverse to the first and second vehicle sides 20,22. The releasing means 52,54 as set forth in FIG. 8, simultaneously releases first and second ends 42,44 of the lap belt irrespective of the direction of transverse impact, while the embodiment of FIG. 9 releases a selected one of the first and second lap belt end portions which is dependent on the direction of side tipover of the vehicle 10. Impact of first side 20 (FIG. 9) will result in release of seat belt second end portion 44 and similarly, impact of the second side 22 will result in release of the lap belt first end portion 42.

The lap belt first and second end portion connecting means 46,48 of FIGS. 8 and 9 function in a similar manner to that of the embodiments of FIGS. 1–7. The difference being in that the first and second end portion releasing means 52,54 each include a linkage assembly 110 which is connected to the tongue engaging member 78 of each of the latching mechanisms 64,64', and a single mass assembly 94 is connected to the linkage assembly 110 and movable in response to an impact force being applied to either one of the first and second vehicle sides 20,22 in directions transverse one of the vehicle sides 20,22 to simultaneously move both tongue engaging member 78,78' and release at least one of the tongue engaging members 78,78' from connection with the tongues 56,56'. In FIG. 8, both tongue engaging members 78,78' are simultaneously released and in FIG. 9 only one tongue engaging member 78,78' is released at a time.

Referring to FIGS. 8 and 9, the supporting member 66 includes a body 112 having an aperture 114 disposed therein which passes through the body 112 and opens in a guideway slot 116 disposed in the body 112. The tongue engaging member 78 is slidably disposed in aperture 114, and a tongue second end portion 60 is slidably disposed in the guideway slot 116. The tongue second end portion 60 has an aperture 118 disposed therethrough, and the tongue engaging member 78 is disposed in the tongue aperture at the tongue engaging position of the tongue engaging member 78. Preferably, the tongue engaging member 78 is a pin having an annular groove 120 disposed about the outer circumference thereof, and the body 112 has a bore 122 disposed therein and opening in the aperture 114. A detent mechanism 124 is positioned in the bore and attached to the body 112 by threads and the like. The detent mechanism 124 forcibly engages the annular groove 120 at the tongue engaging position of the tongue engaging member 78 and prevents inadvertent movement thereof. The force of the detent mechanism 124 is so sized as to prevent inadvertent disconnection of the tongue engaging member 78 from the tongue 56, but small enough in magnitude to permit the weight of the mass assembly 94 to release the pin 78 when impact, due to a side tipover, occurs.

The linkage assembly 110 includes a spring 126 which is connected to the tongue engaging member 78, and a stop 128 which retains the spring on the tongue engaging member 78 and in engagement with the body 112. The spring biases the tongue engaging member towards the tongue releasing position.

The linkage assembly of FIG. 8 includes a bellcrank 130 which has first, second, and third end portions 132,134,136 and is pivotally connected to the operator's station 16 in any suitable manner. The bellcrank first end portion 132 is pivotally connected to the tongue engaging member 78 of the lap belt first end portion connecting means 46. The bellcrank second end portion 134 is pivotally connected to the tongue engaging member 78' of the lap belt second end portion connecting means 48, and the mass assembly 94 is pivotally connected to the bellcrank third end portion 136.

With reference to FIG. 9, the mass assembly 94 of FIG. 9 has first and second spaced apart ends 138,140 and is connected at the first end 138 of the mass assembly 94 to the tongue engaging member 78 of the lap belt first end portion connecting means 46 and at the second end 140 of mass assembly 94 to the tongue engaging member 78' of the lap belt second end portion connecting means 48. It should be noted that the construction of the connecting means 46,48 of FIGS. 8 and 9 are identical.

INDUSTRIAL APPLICABILITY

With reference to the drawings and particularly FIGS. 1-7, the operator restraint system 38 restrains the operator on the vehicle seat during normal operation and only releases the operator from restraint thereon in response to an impact force being applied to the vehicle 10 in a direction transverse to one of the first and second vehicle sides 20,22. The lap belt 40 is automatically released from connection with the operator station 16 only when the impact force is in the aforementioned substantially transverse directions, such as caused by a side tipover.

With reference to FIGS. 3 and 4, impact of the first vehicle side 20 caused by the side tipover in the direction of the first vehicle side 20 causes the momentum of mass member 94 to pivot the mass member 94 about shaft 90 from the first position 96 toward the second position 98. In doing so, engaging finger 106 contacts the second end portion 102 of lever arm 88 and forces the protrusion 86 of tongue engaging member 78 from being disposed in aperture 84, and thereby releases tongue second end portion 60 from restraining engagement with the tongue engaging member 78. The weight of the vehicle operator acting against the lap belt, subsequent to the tongue engaging member 78 being pivoted from the tongue engaging position to the tongue releasing position by the mass assembly 94, will urge the tongue 56 from the guideway 92 and release the operator to slide from the seat to the ground in the same direction of movement as the side tipover.

Upon impact between side 20 and the ground vehicle 10 motion ceases, but the momentum of the mass assembly 94 continues to move in the same direction that it was moving in just before impact. Because the momentum of the mass assembly 94 acting upon the lever arm 88 during a side tipover impact is adequate to overcome the force of biasing means 80 and the latching frictional forces, release of tongue 56 takes place. Thus, the release takes place because the mass assembly 94 has momentum and kinetic energy in the direction of the side tipover.

In applications where the lap belt first and second end portion releasing means 52,54 is utilized, a side tipover in the direction of the vehicle second side 22 will result in pivotal movement of the second mass assembly 94' about shaft 90' in a direction toward the second side 22 and release of the tongue 56 from latching engagement with the lap belt second end portion tongue engaging member 78' in a manner identical to that of the release of the lap belt first end portion 42.

During impacts other than those which are transverse to the vehicle sides 20 and 22, the tongue engaging member 78 is biased against the supporting member 66 by spring 82 which maintains the tongue engaging member 78 at the tongue engaging position and restrains the tongue 56 in the guideway 92. During testing, it has been found that side tipover impacts may be of a magnitude sufficient to not only release one of the lap belt first and second end portions 42,44 from connection with the operator's station 16, but also the other of the lap belt first and second end portions 42,44 from connection with the operator's station 16. Apparently, a rebound momentum causes the mass assembly 94,94' to move and release the other lap belt end portions 42,44.

The first and second locations 47,49 of the lap belt first and second end portions, respectively, are established to maintain the lap belt at a proper position across the operator's lap and close to the normal pivot of the operator on the seat 26. The first and second lap belt portions 42,44 are looped about the slidable adjusting pin connected to the first end portion 58,58' of the tongues 56,56' in a conventional manner so that the lap belt may be adjusted to accommodate different sizes of operators. The anti-creep slide 62,62' secures the lap belt first and second end portions 42,44 at the desired length and prevent inadvertent movement thereof in a conventional manner.

The apparatus of FIG. 8 operates in a similar manner as that of the embodiment of FIGS. 1-7 with the exception that the means 52 for releasing the lab belt first end portion and means 54 for releasing the lap belt second end portion are simultaneously actuated irrespective of the direction of side tipover so that both tongues 56,56' are simultaneously released at the instant of impact between one of the first and second vehicle sides 20,22 and the ground. The bellcrank 130 of the linkage assembly 110 pivots about the pivotal connection with the operator's station 16 in the direction of side tipover due to the mass assembly 94 applying a force to the bellcrank 130 in that direction. The combination of the force of the mass assembly 94 and the force of spring 126 acting against the tongue engaging member 78 overcomes the force of the detent 124, and urges the tongue engaging member 78 from engagement with the tongues 56, and releases the tongue 56 from connection to the operator's station 16. It should be noted that the detent 124 is of a force sufficient to maintain the tongue engaging member 78 in the tongue engaging position at all times except during side impact of the vehicle during a side tipover.

With reference to FIG. 9, the operation of the means 46 for connecting the lap belt first end portion and means 48 for connecting the lap belt second end portion are identical to that as described with respect to FIG. 8. The difference between the embodiment of FIG. 8 and that of FIG. 9 is that the mass assembly 94 defines a stiff link between the tongue engaging members 78 (not shown) and releases only one of the tongue engaging members 78,78' from engagement with one of the tongues 56,56' depending on the direction of side tipover.

Thus, it can be seen that the operator restraint system 38 considers all aspects of operator safety and achieves it in an efficient and simple manner.

Other aspects, objects, and advantages of this invention can be obtained from a study of the drawings, the disclosure, and the appended claims.

We claim:

1. A work vehicle comprising:
   first and second spaced apart vehicle sides;
   an operator station having a seat, said seat having first and second spaced apart side portions and being mounted on said operator station;
   a lap belt having first and second spaced apart end portions;
   means for connecting said lap belt first end portion to said operator station at a first location adjacent the seat first side;
   means for connecting the lap belt second end portion to said operator station at a second location adjacent the seat second side; and
   means for automatically releasing one of the first and second lap belt end portions from connection with said operator's station in response to and simultaneously with a vehicle side over turn generated impact being applied to one of the first and second vehicle sides in a direction transverse to one of the first and second seat side portions, said automatic releasing means being maintained from releasing said one of the first and second end portions in response to an impact with the vehicle in directions longitudinal of the first and second sides and being free from external contact.

2. A work vehicle, as set forth in claim 1, wherein said automatic releasing means includes a mass assembly pivotally connected to the operator station and pivotally movable only in directions transverse the first and second vehicle sides; said mass assembly being pivotally movable transversely of the first and second vehicle sides, in response to the forces generated by said side overturn impact, to release said one of the first and second lap belt end portions from connection with the operator station.

3. An operator restraint system for a work vehicle comprising:
   an operator station having a seat, said seat having first and second spaced apart side portions and being mounted on said operator station;
   a lap belt having first and second spaced apart end portions;
   means for connecting said lap belt first end portion to said operator station at a first location adjacent the seat first side;
   means for connecting the lap belt second end portion to said operator station at a second location adjacent the seat second side, one of said connecting means having a tongue, and a latching mechanism, said latching mechanism having first and second spaced apart end portions and being connected at said tongue first end portion to one of the lap belt first and second end portions, said latching mechanism having a supporting member and a tongue engaging member movably connected to said supporting member, said supporting member being mounted on said operator station at one of said first and second locations, said tongue engaging member being movable between a tongue engaging position at which said tongue second end portion is engaged with the tongue engaging member and restrained from movement relative to the latching mechanism, and a tongue releasing position at which the tongue second end portion is free from engagement with the tongue engaging member and free to move relative to said latching mechanism; and
   means for automatically releasing one of the first and second lap belt end portions from connection with said operator's station in response to an impact being applied to said vehicle in a direction transverse to one of the first and second seat side portions, said automatic releasing means having a mass assembly connected to said tongue engaging member and being movable between first and second spaced apart positions relative to the supporting member in a direction substantially transverse of one of the seat first and second side portions in response to said impact being applied to said vehicle in said transverse direction, said tongue engaging member being movable from said tongue engaging position to said tongue releasing position in response to movement of said mass assembly from said first position toward said second position, said mass assembly including;
   a lever arm having first and second spaced apart end portions;
   a shaft connected to the supporting member, said lever arm being pivotally connected to said shaft, and said shaft being axially oriented in a direction substantially parallel to one of the first and second seat sides; and
   a weight member connected to the lever arm and movable between said first and second spaced apart positions.

4. An operator restraint system, as set forth in claim 3, wherein said latching mechanism includes a means for biasing the tongue engaging member toward said tongue engaging position.

5. An operator restraint system, as set forth in claim 3, wherein said mass assembly is pivotally connected to said shaft and engageable with the lever arm second end portion.

6. An operator restraint system, as set forth in claim 4, wherein said means for biasing the tongue engaging member toward said tongue engaging position includes a spring disposed about said shaft and engageable with said supporting member and said lever arm, said spring biasing said tongue engaging member toward said tongue engaging position.

7. An operator restraint system, as set forth in claim 3, wherein said weight member includes a plurality of stacked weight segments, and means for connecting said weight segments to said lever arm.

8. An operator restraint system, as set forth in claim 3, wherein said tongue second end portion has an aperture disposed therethrough, and said tongue engaging member includes a protrusion mounted on said lever arm, said protrusion being disposed in the aperture of the tongue second end portion at the tongue engaging position of the tongue engaging member.

9. An operator restraint system, as set forth in claim 3, wherein said supporting member and said lever arm are spaced a preselected distance from each other and define a guideway therebetween, said tongue second end portion being disposed in the guideway at said tongue engaging position.

10. An operator restraint system, as set forth in claim 3, wherein said operator's station has a seat support surface, and said means for connecting the first and second lap belt end portions each include:
a support bracket having a base portion and an arm portion connected to and extending from said base portion;
a fastener connecting said base portion to said seat support surface; and
a fastener pivotally connecting said supporting member to said arm portion.

11. An operator restraint system, as set forth in claim 3, wherein said operator's station has a seat supporting surface and said seat has a seat supporting frame, said seat supporting frame being mounted on said seat supporting surface and said lap belt first and second end portion connecting means, each include a fastener pivotally connecting the supporting member to the seat supporting frame.

12. A material handling vehicle, comprising:
an operator station having a seat supporting surface, first and second spaced apart vehicle sides connected to said seat supporting surface, an overhead guard mounted on the vehicle, and a seat having first and second spaced apart side portions and being mounted on the seat supporting surface at a location between said first and second vehicle sides, and beneath the overhead guard;
a lap belt having first and second spaced apart end portions;
means for connecting said lap belt first end portion to said operator station at a first location adjacent the seat first side;
means for connecting the lap belt second end portion to said operator station at a second location adjacent the seat second side;
means for automatically releasing the lap belt first end portion from connection with said operator's station in response to an impact being applied to one of the first and second vehicle sides; and
means for automatically releasing the lap belt second end portion from connection with said operator's station in response to an impact being applied to the other of the first and second vehicle sides.

13. A material handling vehicle, as set forth in claim 12, wherein said lap belt first and second end portion connecting means each include:
a tongue having first and second spaced apart end portions; and
a latching mechanism having a supporting member and a tongue engaging member movably connected to said supporting member, said tongue of the lap belt first end portion connecting means being connected at the tongue first end portion to said lap belt first end portion, and said tongue of the lap belt second end portion connecting means being connected at the tongue first end portion to said lap belt second end portion, said supporting member of the lap belt first end portion connecting means being connected to said operator station at said first location adjacent the seat first side and said supporting member of the lap belt second end portion connecting means being connected to said operator station at said second location adjacent the seat second side, said tongue of the lap belt first end portion connecting means being movable between a tongue engaging position at which the tongue second end portion is engaged with the tongue engaging member of the lap belt first end portion connecting means and restrained from movement relative to the latching mechanism of the lap belt first end portion connecting means, and a tongue releasing position at which the tongue second end portion of the lap belt end portion connecting means is free from engagement with the tongue engaging member of the lap belt first end portion connecting means and free to move relative to the latching mechanism of the lap belt first end portion connecting means, said tongue of the lap belt second end portion connecting means being movable between a tongue engaging position at which the tongue second end portion is engaged with the tongue engaging member of the lap belt second end portion connecting means and restrained from movement relative to the latching mechanism of the lap belt second end portion connecting means, and a tongue releasing position at which the tongue second end portion of the lap belt second end portion connecting means is free from engagement with the tongue engaging member of the lap belt second end portion connecting means and free to move relative to the latching mechanism of the lap belt second end portion connecting means.

14. A material handling vehicle, as set forth in claim 13, wherein said lap belt first and second end portion releasing means each include:
a mass assembly connected to said tongue engaging member of each of the lap belt first and second end portion connecting means, said mass assemblies each being movable between first and second spaced apart positions relative to the supporting member of the lap belt first and second end portion connecting means, respectively, in a direction substantially transverse of the vehicle first and second sides, respectively, in response to said impact being applied in a transverse direction to said vehicle first and second sides, respectively, said tongue engaging member of the lap belt first end portion connecting means being movable from said tongue engaging position to said tongue releasing position in response to movement of said mass assembly of the lap belt first end portion releasing means from said first position toward said second position, and said tongue engaging member of the lap belt second end portion connecting means being movable from said tongue engaging position to said tongue releasing position in response to movement of the mass assembly of said lap belt second end portion releasing means from said first position toward said second position.

15. A material handling vehicle, as set forth in claim 14, wherein said latching mechanism of the lap belt first and second end portion connecting means each include means for biasing the tongue engaging member towards said tongue engaging position.

16. A material handling vehicle, as set forth in claim 15, wherein each of said mass assemblies include:
a lever arm having first and second spaced apart end portions;
a shaft connected to the supporting member, said lever arm being pivotally connected to said shaft, and said shaft being axially oriented in a direction substantially parallel to the one of the first and second vehicle sides; and a weight member connected to the lever arm and movable between said first and second spaced apart positions relative to the supporting member.

17. A material handling vehicle, as set forth in claim 16, wherein said weight member is pivotally connected to said shaft and engageable with the lever arm second end portion.

18. A material handling vehicle, as set forth in claim 13, wherein said lap belt first and second end portion releasing means each include:

a linkage assembly connected to the tongue engaging member of each of the latching mechanisms; and a mass assembly connected to said linkage assembly and being movable, in response to an impact being applied to either one of the first and second vehicle sides in directions transverse of one of said vehicle sides, to simultaneously move each tongue engaging member and release at least one of the tongue engaging members from connection with one of the tongues.

19. A material handling vehicle, as set forth in claim 18, wherein each of said supporting members include a body having an aperture and a guideway slot disposed therein, said aperature passing through said body and opening in said guideway slot, said tongue engaging member being slidably disposed in said aperture and said tongue being slidably disposed in said guideway slot, said tongue having an aperture disposed therethrough and said tongue engaging member being disposed in the tongue aperture at the tongue engaging position.

20. A material handling vehicle, as set forth in claim 19, wherein said tongue engaging member is a pin having an annular groove disposed thereabout, said body has a bore disposed therein and opening in said body aperture, and wherein said latching mechanism includes:

a detent mechanism disposed in the bore and connected to the body, said detent mechanism being forceably engaged in the annular groove at the tongue engaging position of the pin.

21. A material handling vehicle, as set forth in claim 18, wherein said linkage assembly includes:

a bellcrank having first, second, and third end portions and being pivotally connected to said operator's station, said bellcrank first end portion being pivotally connected to the tongue engaging member of the lap belt first end portion connecting means, said bellcrank second end portion being pivotally connected to the tongue engaging member of the lap belt second end portion connecting means, and said mass assembly being pivotally connected to said bellcrank third end portion.

22. A material handling vehicle, as set forth in claim 19, wherein said linkage assembly includes:

a spring connected to the tongue engaging member; and a stop retaining the spring on the tongue engaging member and in engagement with the supporting member, said spring biasing the tongue engaging member to the tongue releasing position.

23. A material handling vehicle, as set forth in claim 20, wherein said mass assembly has first and second spaced apart ends and is connected at the first end of the mass assembly to the pin of the lap belt first end portion connecting means and at the second end of the mass assembly to the pin of the lap belt second end portion connecting means.

* * * * *